(No Model.)

G. W. SCOTT.
GRAIN BINDER.

No. 267,600. Patented Nov. 14, 1882.

WITNESSES
Wm A. Skinkle
Geo. W. Breck

INVENTOR
George W. Scott.
By his Attorneys
Pennison Red Pennison

UNITED STATES PATENT OFFICE.

GEORGE W. SCOTT, OF TROY, ASSIGNOR TO ABEL HOOVER AND WILLIAM GAMBLE, OF MIAMISBURG, OHIO.

GRAIN-BINDER.

SPECIFICATION forming part of Letters Patent No. 267,600, dated November 14, 1882.

Application filed May 1, 1882. (No model.)

*To all whom it may concern:*

Be it known that I, GEORGE W. SCOTT, of Troy, in the county of Miami and State of Ohio, have invented certain new and useful Improvements in Grain-Binders, of which the following is a specification.

In machines for the automatic binding of grain, as now usually built, the sheaf after being bound is removed from the chute or passage-way in which the binding takes place by means of a revolving or orbitally-moving ejecting finger or fingers. When the crop being harvested is in good condition—that is, straight or standing—the gavels will reach the binder in such shape that ordinarily the ejector will have no difficulty in doing its work cleanly; but when the crop has been laid or lodged by storms the grain will come in a tangle, and the bound sheaves, instead of being pushed out and falling upon the stubble, will oftentimes cling to the ejector until the next binding operation is completed, and then be carried up and over with it as it starts in its movement to eject the new sheaf, thus clogging the machine.

My invention consists in combining with the ejector a stop or stripper which will abut against any sheaf entangled therewith as the ejecting-fingers move in their upward orbit and cause it certainly to be pushed off and dropped. This stripper I prefer to make adjustable, alterable, or removable, so that it may be properly fitted to its work, or that under favorable conditions of the crop it may be modified or kept out of action.

Figure 1:
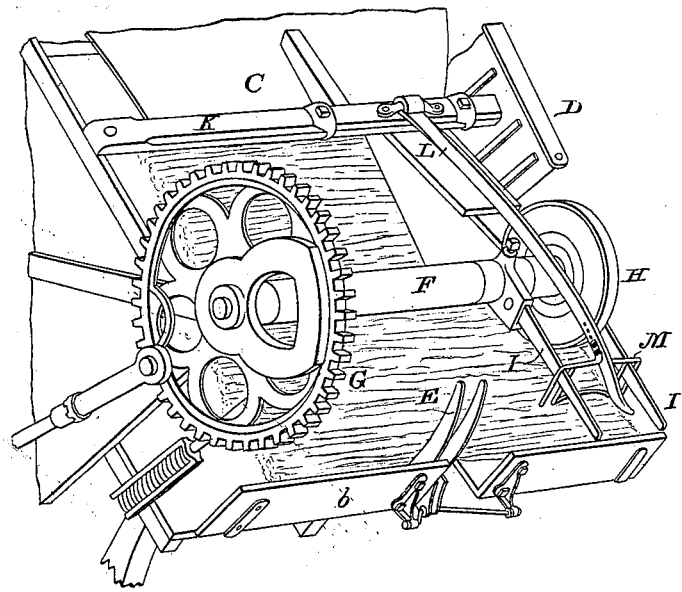
Figure 2:
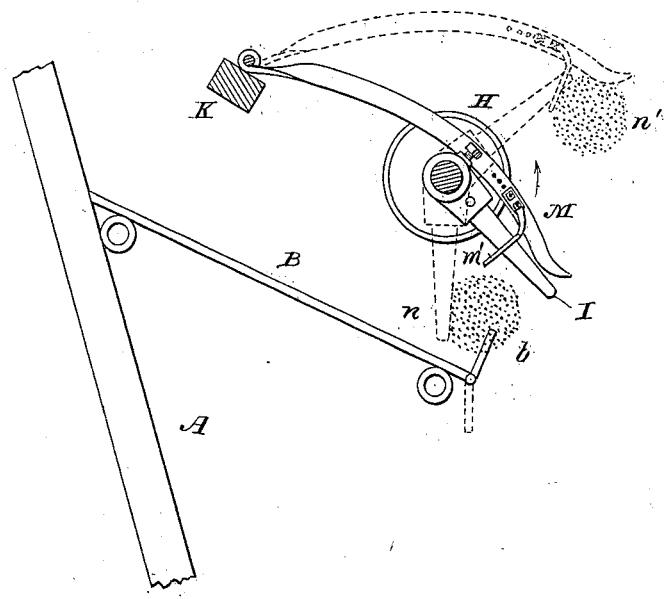
Figure 3:
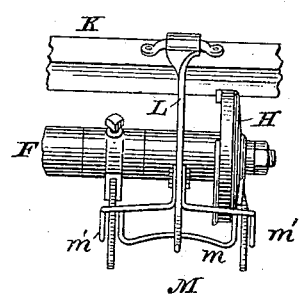

In the drawings, Figure 1 is a perspective view of so much of a binding attachment to a harvester as is necessary to explain my invention. Fig. 2 is a vertical transverse section thereof with parts omitted, showing the action of the ejector and stripper in the form I prefer to use. Fig. 3 is a front perspective view of said ejecting and stripping mechanism.

A is one of the outside elevator-struts of the harvester-frame. B is the decking, grain-chute, or grain-receptacle of the binder, provided at its foot with a hinged wing or shelf, *b*, to aid in supporting the grain; C, a guard or deflector placed over the head of such chute, to direct grain into it from the harvester-elevator; D, a butting-apron movable to adjust the grain lengthwise of the receptacle in order to bring the band properly about the middle of the gavel; E, the compressing and tripping arms, which start the mechanism when sufficient grain has been packed against them to form a sheaf; and F, the shaft by which, through the instrumentality of gear G and gear and cam wheel H, the band-holding, band-securing, and band-severing devices are operated. The shaft F, it will be understood, is intermittingly given one full revolution, the periods between such revolutions depending upon the length of time in which a gavel accumulates, and each revolution being induced by the starting of the binding mechanism through the medium of tripping-arms.

The parts thus far enumerated are old and well known in this class of machines.

It has been customary to place upon the shaft F, or upon some other suitably-located intermittently-revolving shaft, one or more ejecting-fingers, I, preferably near to the location of the band-securing devices, and consequently to the center of the sheaf. Where two fingers are used one is usually placed on either side of said band-securing devices. The normal position of these fingers when the shaft is at rest is that shown in Fig. 1, or as indicated in full lines in Fig. 2. When the shaft is started they are carried around in the direction of the arrow, and reach the rear or grain side of the sheaf just as the ends of the bands have been united and the tripping-arm recedes to open the exit-passage from the receptacle. In their further continuous movement to their starting-point they push the bound sheaf before them, and under favorable circumstances discharge it cleanly from the machine. As, however, there is a liability, heretofore alluded to, of entanglement when the machine is working in lodged grain, causing the sheaf to cling to the ejector-fingers and be taken over into the grain-chute upon their next movement, thus clogging it and necessitating a temporary stoppage of the machine, I propose to apply to these ejector-fingers a guard, stop, or stripper, which shall itself be removed from danger of entanglement at the time such liability occurs, but shall at a proper point in the motion of the arms act to push the sheaf certainly and completely therefrom. This stripper may assume various forms, determined to some extent by the exigencies of the machine or the construction of the ejector or individual choice. That form which I deem preferable I have represented in the drawings and will now proceed to describe.

To a cross-piece, or it may be a bracket, K, above the band-securing mechanism or over the grain-chute, I hinge an arm, L, which overlies the driving-shaft, and is prolonged between the ejector-fingers nearly or quite to their ends as they are at rest. Upon this arm I mount a breast, guard, or prong-frame, M, adapted to sit over the stationary ejector-fingers about midway of their length, and free to ride thereupon. This breast or frame is advisably made adjustable upon its supporting-arm, that it may be properly fitted to its work. In the particular instance here shown it is made of skeleton form, being composed of a curved body or breast portion, $m$, which traverses the space between the two ejecting-fingers and prongs or tines $m'$, one saddling each finger.

Since the stripper-arm is pivoted to the frame-work of the machine eccentrically to the ejector-fingers and rests upon the latter by means of its prong-frame, it is evident that when these fingers rise they will lift the stripper and be gradually withdrawn from between its prongs; or, in other words, these prongs will be forced to rise up on the ejector-fingers until they reach and pass their points, when the stripper-arm, losing its support, will fall and rest upon the driving-shaft in position to receive the ejector as it comes around to its position of rest. The ejector, however, continuing its revolution, will gather the bound sheaf and discharge it, as at $n$, immediately thereafter reaching the stripper and stopping until the machine is again tripped. Now, supposing the sheaf just pushed out by the ejector to have become in some way entangled with its fingers, it will, instead of falling upon the stubble at the side of the machine, be taken with said fingers to their stopping-point and hang depending from them immediately in front of the stripping breast or prongs. When the ejector again starts the clinging sheaf will be carried up with it in the initial part of its revolution; but at the same time the stripper begins to travel along the ejecting-fingers toward their point, and its prongs abut against the sheaf and push it outward until it is finally entirely stripped from the fingers, as at $n'$, and drops upon the ground. When the stripper-arm projects sufficiently beyond the breast to come over the top of any gavel clinging to the ejector, the prongs $m'$ saddling the ejector-fingers may be omitted, and the sheaf as it is carried up will itself lift said arm from its seat upon the driving-shaft and serve as its guide in the stripping action.

Instead of the construction just described, the stripper may be so mounted as to revolve with the ejector, and, by means of a stationary cam or eccentric circumscribing the driving-shaft, caused to slide along its fingers at the proper moment to strip the sheaf therefrom. It may also be caused to act immediately before the fingers reach their stopping-point, or even while they are at rest, to strip the sheaf therefrom immediately after it is bound. Such modifications and others which will readily occur to the skilled mechanic I consider within the scope of my invention.

I claim—

1. In a grain-binder, the combination, with the revolving ejecting or discharging arms or fingers, of a stripper which moves relatively along them and parallel to their length to push off entangled sheaves.

2. In a grain-binder, the combination, with the revolving ejector, of a stripper so arranged and controlled as to move with and along the ejector-fingers during a portion of their revolution to strip the sheaf therefrom.

3. In a grain-binder, the combination, with the revolving ejector, of a stripper-arm pivoted eccentrically thereto, and provided with a breast or pronged frame, which moves along the ejecting-fingers toward their points during a portion of their revolution to push off any sheaf which may cling thereto.

4. In a grain-binder, the combination, with the ejector I, of the pivoted stripper-arm L and the breast or prong-frame M, substantially as described.

5. In combination with the ejector and stripper-arm, the adjustable breast or prong-frame upon the latter.

6. In combination with the ejector-fingers and the stripper-arm, the prong-frame formed, as described, with a central breast traversing the space between said fingers, and with prongs which saddle them.

GEO. W. SCOTT.

Witnesses:
W. W. EDGE,
GEORGE LONG.